(12) United States Patent
Torsner et al.

(10) Patent No.: US 9,131,496 B2
(45) Date of Patent: *Sep. 8, 2015

(54) DIRECT TRANSITION TO CELL DCH

(71) Applicant: LENOVO GROUP LIMITED, Quarry Bay, Hong Kong (CN)

(72) Inventors: Johan Torsner, Kyrkslatt (FI); Joakim Bergstrom, Stockholm (SE)

(73) Assignee: LENOVO GROUP LIMITED, Quarry Bay (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,353

(22) Filed: Oct. 10, 2012

(65) Prior Publication Data

US 2013/0040667 A1    Feb. 14, 2013

Related U.S. Application Data

(63) Continuation of application No. 10/597,932, filed as application No. PCT/SE2005/000180 on Feb. 11, 2005, now Pat. No. 8,320,929.

(30) Foreign Application Priority Data

Feb. 13, 2004 (SE) ...................................... 0400341

(51) Int. Cl.
*H04W 68/02*     (2009.01)
*H04W 72/04*     (2009.01)
*H04W 76/04*     (2009.01)
*H04W 28/06*     (2009.01)
*H04W 84/04*     (2009.01)
*H04W 88/02*     (2009.01)
*H04W 88/12*     (2009.01)

(52) U.S. Cl.
CPC .......... *H04W 72/044* (2013.01); *H04W 76/046* (2013.01); *H04W 28/06* (2013.01); *H04W 84/04* (2013.01); *H04W 88/02* (2013.01); *H04W 88/12* (2013.01)

(58) Field of Classification Search
CPC . H04W 28/06; H04W 72/044; H04W 76/046; H04W 84/04; H04W 88/02; H04W 88/12
USPC ......... 370/341, 465, 338, 328, 329, 322, 349, 370/368, 229–236, 252–253; 455/458, 452, 455/453
See application file for complete search history.

(56) References Cited

U.S. PATENT DOCUMENTS 6,594,238 B1 * 7/2003 Wallentin et al. ............. 370/252
7,099,346 B1 * 8/2006 Kanterakis ................... 370/431
2005/0070252 A1 * 3/2005 Farnsworth ................ 455/412.1

OTHER PUBLICATIONS

All References Cited in Parent Publication No. US 2007-0060153 A1.

* cited by examiner

*Primary Examiner* — Babar Sarwar

(57) ABSTRACT

The present invention relates to methods and arrangements for reducing the time delay associated with the initialization of a data transfer in a Universal Mobile Telecommunications Systems (UMTS) terrestrial radio access network (UTRAN). A Radio Network Controller (RNC) initiates a data transfer by transmitting a downlink paging message to a User Equipment (UE), wherein the UE is capable of being in the states URA PCH, CELL PCH or CELL DCH. The paging message comprises information for transferring the UE from the URA PCH or the CELL PCH state directly to the CELL DCH state by means of delay reducing information indicated in the paging message.

18 Claims, 6 Drawing Sheets

DIRECT TRANSITION TO CELL DCH

CROSS-REFERENCE TO RELATED APPLICATIONS

This application is a continuation of U.S. application Ser. No. 10/597,932, filed Aug. 11, 2006, which was the National Stage of International Application No. PCT/SE2005/000180, filed Feb. 11, 2005, which claims the benefit of Sweden Application No. 0400341-4, filed Feb. 13, 2004, the disclosures of which are incorporated herein by reference

FIELD OF THE INVENTION

The present invention relates to methods and arrangements in a mobile communication network. In particular, the present invention relates to methods and arrangements for reducing the time delay associated with the initialisation of a data transfer in a UMTS Radio Access Network (UTRAN).

BACKGROUND OF THE INVENTION

FIG. 1 shows a Universal Mobile Telephony System (UMTS). The UMTS network comprises a Core Network (CN) 100 that is connectable to other networks such as the Internet, other mobile networks e.g. GSM systems and fixed telephony networks denoted POTS in FIG. 1. The CN 100 is connected to a plurality of Radio Network Controllers (RNCs) 102 belonging to the UMTS Radio Access Network (UTRAN). The respective RNC 102 controls a plurality of Node-Bs 104 comprising one or more base stations 106. Each base station covers an area, i.e. a cell and is arranged to serve the mobile terminals within said cell. Finally, the mobile terminals 108, also referred to as User Equipments (UE) are connected to one or more base stations 104.

In the UTRAN a user equipment (UE) can be in one of several RRC states depending on the user activity. These states comprise Idle Mode, URA_PCH, CELL_PCH, CELL_FACH and CELL_DCH, listed in order of increasing user activity.

In Cell_PCH and URA_PCH, no communication is possible and minimum radio and battery resources are consumed. When the UE has data to send, it needs to transmit a Cell Update message to the UTRAN, indicating that uplink data is available. When UTRAN has data to send to a UE in CELL_PCH or URA_PCH it needs to send a paging message to the UE, and the UE responds with a Cell Update message to indicate in which cell it is located.

In CELL_FACH, communication is possible but with low data rate and high round trip time due to the properties of the shared channel used in this state. A UE in this state consumes more radio resources compared to CELL_PCH/URA_PCH but less resources than compared to CELL_DCH.

In CELL_DCH the UE has a dedicated channel available which implies that communication with high data rate and low round trip time is possible.

The CELL_DCH state provides the best user performance in terms of data rate and delay, but also consumes the most resources, e.g. in terms of power and codes. Thus it may be necessary to move users to lower states when the data transmission stops. A typical case for many applications is that data transmission occurs so seldom that the UE is in CELL_PCH or URA_PCH state when a data burst transmission starts. This implies that the delay to move from CELL_PCH/URA_PCH to CELL_DCH needs to be minimized, in order to have a good user performance. If the application transmits small data objects the time to change state will have a more significant impact on the user performance than the data rate on DCH. A Push-to-Talk service is one example, where rather small objects are transmitted rather infrequently. This service could start with a burst from the network side if the terminal in CELL PCH/URA PCH is the receiver of the talk burst. In this the delay for transmitting a data object (including transition to CELL_DCH) is to a large extent determined by the time to move from CELL/URA_PCH to CELL_DCH.

When a UE in CELL/URA_PCH needs to transmit uplink data, the typical signalling sequence is shown in FIG. 2. In step 1, the UE sends a Cell Update message to indicate that it has uplink data available to transmit. In step 2, UTRAN responds with transmitting a Cell Update Confirm message which acknowledges the Cell Update Message and orders the UE to enter CELL_FACH state, where data transmission is possible. In step 3, The UE transmits a UTRAN Mobility Information Confirm message to acknowledge the Cell Update Confirm message. It is now possible for the UE to transmit data on RACH, i.e. it is in CELL_FACH state. If the available amount of data, which is denoted the Traffic Volume in 3GPP specifications, is above a configured threshold the UE transmits a Measurement Report to inform UTRAN about the available amount of data (step 4). When UTRAN receives the Measurement Report it can decide to move the UE to CELL_DCH since the RACH has very limited performance. UTRAN therefore sends a Radio Bearer Reconfiguration message in step 5 to move the UE to CELL_DCH. The UE responds with a Radio Bearer Reconfiguration Confirm message in step 6, which acknowledges the received message. Now the UE has entered CELL_DCH and can transmit data on the DCH.

Correspondingly, FIG. 3 depicts the typical signalling sequence when a UE in CELL/URA_PCH needs to receive downlink data. The UE receives in step 1 a paging message. The UE shall answer such a paging message. In step 2, the UE answers the paging message by sending a Cell Update message to indicate that it has received the paging message. In step 3, UTRAN responds with transmitting a Cell Update Confirm message which acknowledges the Cell Update Message and order the UE to enter CELL_FACH state, where data transmission is possible. In step 4, The UE transmits a UTRAN Mobility Information Confirm message to acknowledge the Cell Update Confirm message. It is now possible for the UE to receive data on FACH (i.e. it is in CELL_FACH state). If the available amount of data buffered for this UE in the RNC (denoted Traffic Volume in 3GPP specifications) is high enough as evaluated by UTRAN, it can decide to move the UE to CELL_DCH since the FACH has very limited performance. UTRAN therefore sends a Radio Bearer Reconfiguration message in step 5 to move the UE to CELL_DCH. The UE responds with a Radio Bearer Reconfiguration Complete message in step 6, which acknowledges the received message. Now the UE has entered CELL_DCH and can receive data on the DCH.

Another alternative for moving a UE from CELL/URA_PCH to CELL_DCH is depicted by help of FIG. 4. According to this alternative it would also be possible with the current 3GPP specifications to order the UE to CELL_DCH directly in the Cell Update Confirm message. This would result in a signalling sequence as shown in FIG. 4. In this alternative, the UTRAN orders the UE to CELL_DCH already in the Cell Update Confirm Message in step 2. The UE responds with a Radio Bearer Reconfiguration Complete message in step 3 and can then start to transmit data on DCH.

Correspondingly, FIG. 5 shows an alternative signalling sequence for moving a UE from CELL/URA_PCH to CELL_DCH in case of a UTRAN initiated transmission. Here, the UTRAN orders the UE to CELL_DCH already in the Cell Update Confirm Message in step 3. The UE responds with a Radio Bearer Reconfiguration Complete message in step 4 and can then start to receive data on DCH.

The alternative signalling sequence for UE initiated transmission described above in FIG. 3 is much faster than the normal sequence. In practice the time to move from CELL/URA_PCH to CELL_DCH can be more than halved. However, this alternative sequence also implies the problem that the UTRAN has no information about the amount of data that the UE has available for transmission. The Cell Update message only contains a cause value indicating the cause for the cell update, in this case "uplink data transmission".

This means that the UTRAN has to move the UE to CELL_DCH without knowing if this is necessary or even desired. For small data objects the transmission time on CELL_FACH is smaller than on CELL_DCH due to the relatively large delay to setup the DCH channel. Thus it would in fact reduce the user performance if the UE is moved to CELL_DCH when the available amount of data is small. Given that it consumes network resources to move users to DCH, these resources are wasted if the UE is moved to DCH when there is no need.

Turning back to FIG. 5, the alternative signaling sequence for UTRAN initiated transmission described in said figure could be seen as somewhat faster than the sequence in FIG. 3. However, since UTRAN have all the knowledge about the downlink buffers for this UE and know already when sending the Paging type 1 message that the UE should be moved to CELL_DCH state, there is no need to have the UE go via the CELL_FACH state before continuing the transition to CELL_DCH state. Performing Cell update procedure in CELL_FACH state (step 2 and 3 in FIG. 5) takes a substantial amount of time since the messages are sent on contention based common channels used by several users. By removing these steps in CELL_FACH state the sequence could therefore be made even faster if the UE transits directly from CELL_PCH/URA_PCH to CELL_DCH. This faster sequence is currently not supported in the 3GPP specifications.

SUMMARY OF THE INVENTION

Thus the objective problem of the present invention is to achieve methods and arrangements for reducing the time delay at an initiation of a data transfer.

The objective problem is solved by methods having the features found in the claims. The problem is also solved by a radio network controller having the features found in the claims and by a User Equipment having features found in the claims.

The method in the UE in accordance with the present invention, comprising the steps of introducing delay reducing information in a data transfer initiating message by the UE, transmitting the data transfer initiating message by the UE, receiving a message from the RNC comprising information for transferring the UE from the URA PCH or the CELL PCH state directly to the CELL DCH state by means of the delay reducing information in the data transfer initiating message, makes it possible to provide a reduction of the delay at an initiation of a data transfer.

The method in the RNC in accordance with the present invention, comprising the steps of introducing delay reducing information in a data transfer initiating message by the RNC, transmitting the data transfer initiating message by the RNC, transmitting a further message from the RNC comprising information for transferring the UE from the URA PCH or the CELL PCH state directly to the CELL DCH state by means of the delay reducing information in the data transfer initiating message, makes it possible to provide a reduction of the delay at an initiation of a data transfer.

The method in the RNC in accordance with the present invention, comprising the steps of transmitting a cell update confirm message on a Forward Access Channel, FACH, and transferring the UE from the URA PCH or the CELL PCH state directly to the CELL DCH state, makes it possible to provide a reduction of the delay at an initiation of a data transfer.

The RNC in accordance with the present invention, comprising means for introducing a delay reducing information in the data transfer initiating and means for transferring the UE from the URA PCH or the CELL PCH state directly to the CELL DCH state by means of the delay reducing information in the data transfer initiating message, makes it possible to provide a reduction of the delay at an initiation of a data transfer.

The RNC in accordance with the present invention, comprising means for transmitting a cell update confirm message on a Forward Access Channel, FACH, and means for transferring the UE from the URA PCH or the CELL PCH state directly to the CELL DCH state, makes it possible to provide a reduction of the delay at an initiation of a data transfer.

The UE in accordance with the present invention, comprising means for introducing delay reducing information in a data transfer initiating message, a transmitter for transmitting the data transfer initiating message,
a receiver for receiving a message from the RNC (102) comprising information for transferring the UE (108) from the URA PCH or the CELL PCH state directly to the CELL DCH state by means of the delay reducing information in the data transfer initiating message, makes it possible to provide a reduction of the delay at an initiation of a data transfer.

The UE in accordance with the present invention, comprising means for receiving a cell update confirm message on a Forward Access Channel, FACH, and means for transferring the UE from the URA PCH or the CELL PCH state directly to the CELL DCH state, makes it possible to provide a reduction of the delay at an initiation of a data transfer.

Preferred embodiments are defined by the dependent claims.

Other objects, advantages and novel features of the invention will become apparent from the following detailed description of the invention when considered in conjunction with the accompanying drawings and claims.

DESCRIPTION OF THE INVENTION

Figure 1:
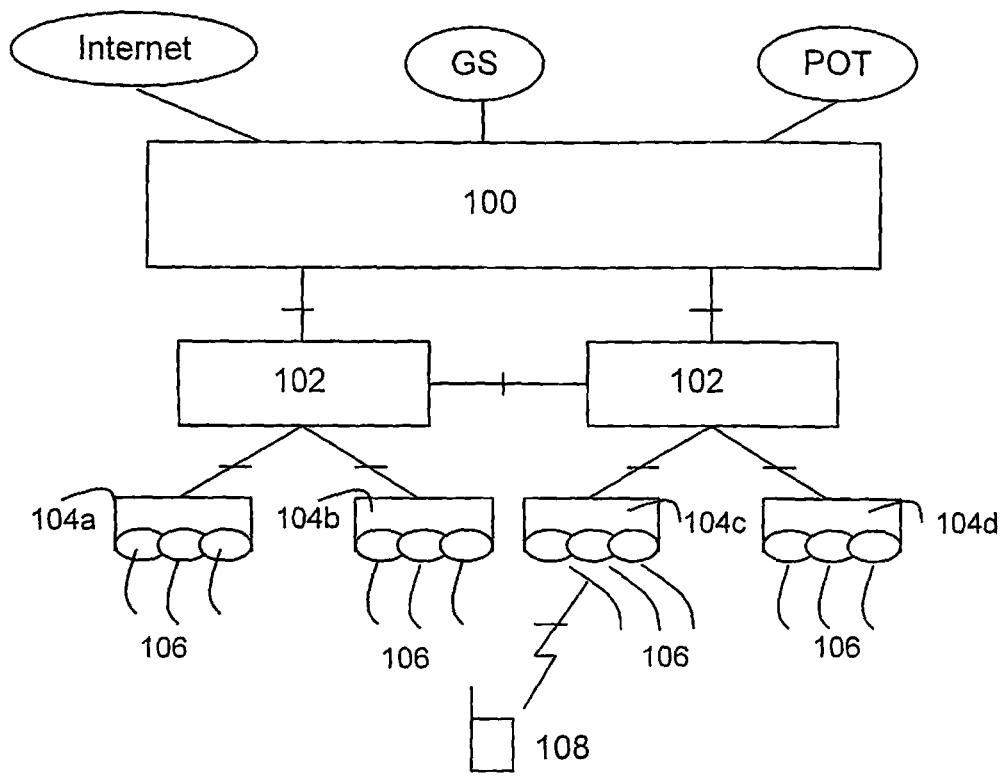
FIG. 1 shows a UMTS network schematically.
Figure 2:
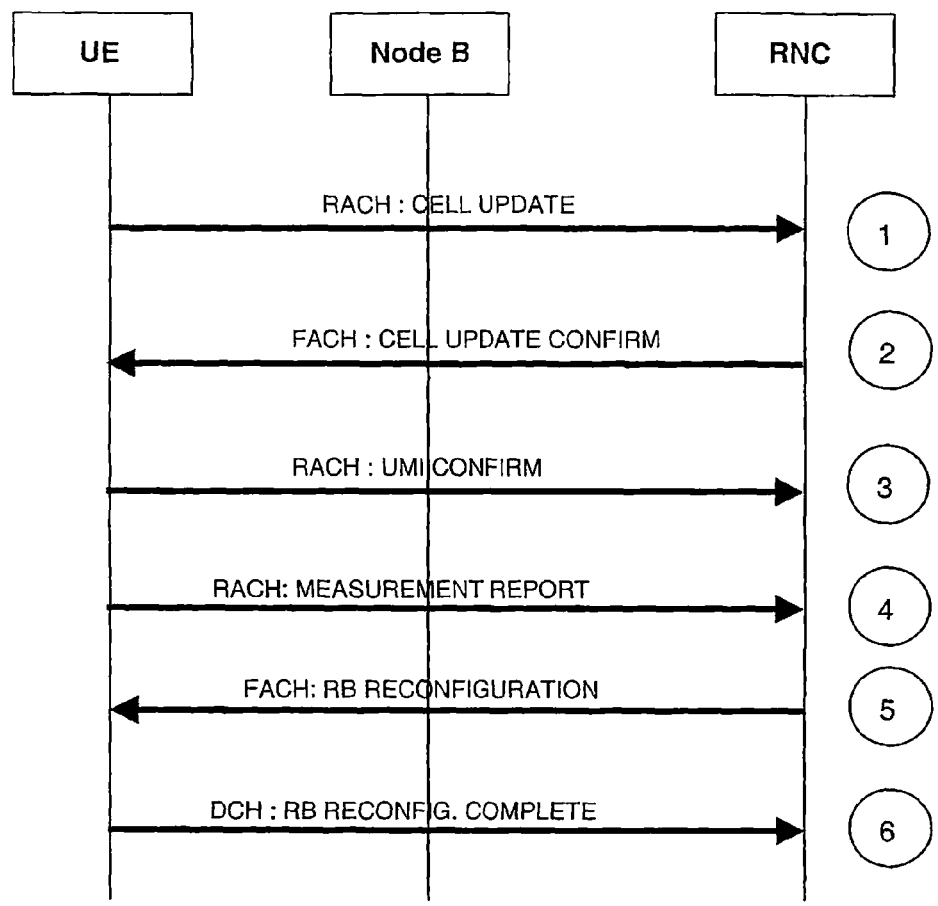
FIG. 2 shows a signalling sequence for moving a UE from CELL/URA_PCH to CELL_DCH in case of a UE initiated transmission according to prior art.
Figure 3:
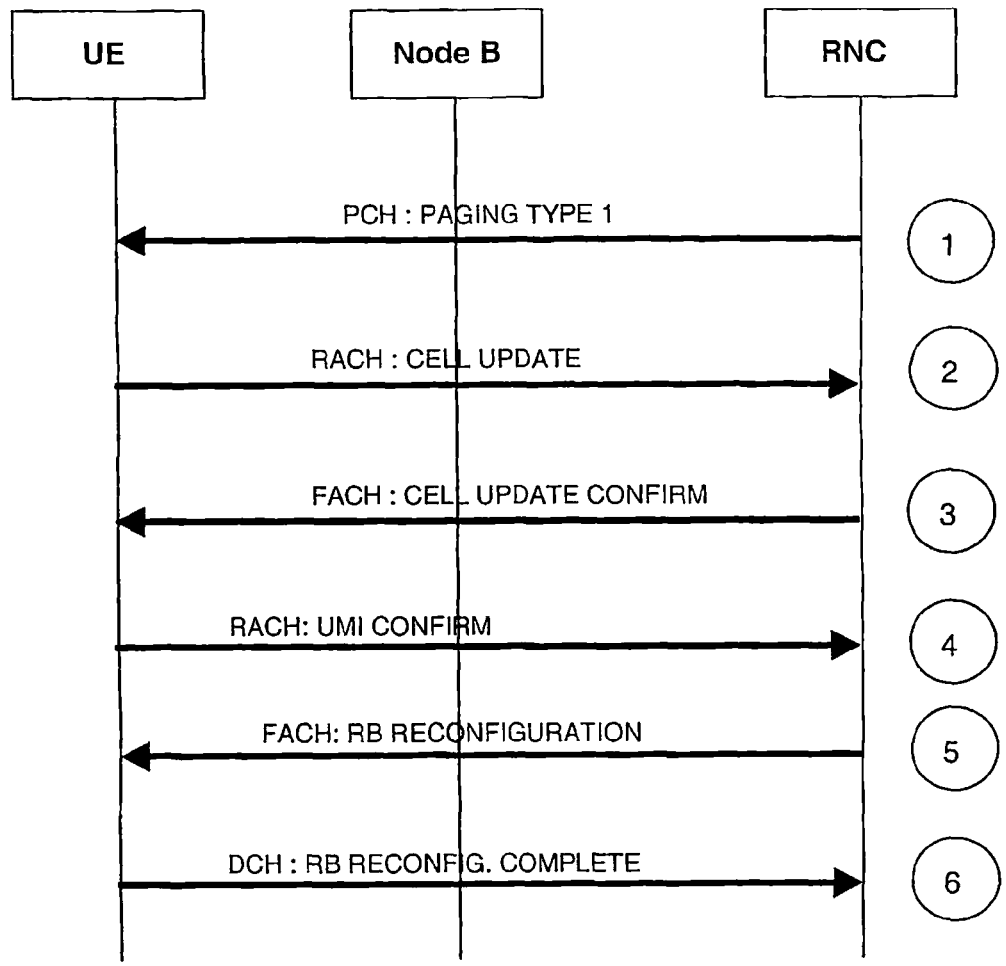
FIG. 3 shows a normal signalling sequence for moving a UE from CELL/URA_PCH to CELL_DCH in case of a UTRAN initiated transmission.
Figure 4:
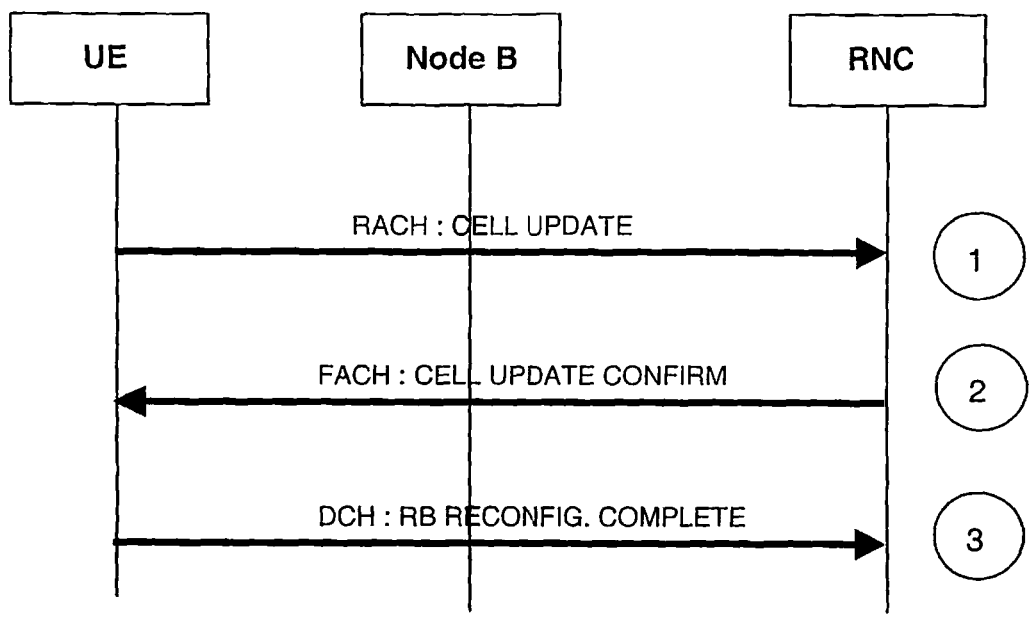
FIG. 4 shows an alternative signalling sequence for moving a UE from CELL/URA_PCH to CELL_DCH in case of a UE initiated transmission.

The methods and arrangements of the present invention may be implemented in a UMTS network as shown in FIG. 1. A Radio Network Controller (RNC) 102 is connectable to a UMTS network and to a plurality of User Equipments (UEs) 108 wherein the UEs are capable of being in the states, URA PCH, CELL PCH, CELL FACH or CELL DCH.

The object of the present invention to reduce the delay at an initiation of a data transfer is achieved by transferring the UE from the URA PCH or the CELL PCH state directly to the CELL DCH state. That is achieved by a transmission of a data transfer initiating message from the unit, i.e. the UE or the RNC in the UTRAN, that initiates the data transfer. The data initiating message comprises delay reducing information that is used for the transition of the UE from the URA PCH or the CELL PCH state directly to the CELL DCH state.

Thus the RNC comprises according to the present invention means for handling a data transfer initiating message and means for introducing a delay reducing information in the data transfer initiating. The RNC comprises further means for transferring the UE from the URA PCH or the CELL PCH state directly to the CELL DCH state by means of the delay reducing information in the data transfer initiating message.

Accordingly, the UE comprises according to the present invention means for handling a data transfer initiating message and means for introducing delay reducing information in a data transfer initiating message. The UE comprises further a transmitter for transmitting the data transfer initiating message and a receiver for receiving a message from the RNC 102 comprising information for transferring the UE 108 from the URA PCH or the CELL PCH state directly to the CELL DCH state by means of the delay reducing information in the data transfer initiating message.

UE Initiated Data Transfer

According to one embodiment of the present invention, the data transfer initiating message is an uplink Cell Update message transmitted by the UE. It is known that the Cell Update message can be extended with a traffic volume measurement. However, due to limitations on the air interface and the fact that the Cell update is transmitted on RLC transparent mode it is not desirable to extend the message size to the extent that would be needed.

A solution to the problem described above is to modify the Cell Update message in a way that provides certain delay reducing information about the traffic volume without significantly increasing the message size. The general idea is that instead of indicating the Traffic Volume explicitly, it is indicated in relation to a threshold, e.g. if the Traffic Volume is above a previously configured threshold. This threshold can be configurable by UTRAN. Normally the traffic volume measurements in the UE are configured in such a way that measurement reports in CELL_FACH are transmitted if the traffic volume exceeds a threshold and potentially the same value as used to trigger the transmission of a measurement report could be used for setting the flag in the Cell update message. This method would mean that no downlink signalling would need to be changed. However, the threshold for the Cell Update message can also be configured separately.

In addition to the Traffic Volume information it could be beneficial to indicate further delay reducing information, e.g. if the uplink data is available on a user radio bearer or a signalling radio bearer. This is also indicated in the cell update message according to one embodiment. The benefit with this additional info would be that the UTRAN may choose not to move UEs to CELL_DCH if the data comes from a signalling radio bearer since the transmission on signalling radio bearers is not expected to be extended in time.

In order to reduce the DCH setup time from CELL_PCH and URA_PCH it is an object of the present invention to be able to perform a direct switch to CELL_DCH. To facilitate a direct switch the present invention proposes to modify the format of the CELL_UPDATE message to indicate, e.g., whether the UE has a traffic volume above a configured threshold, which is preferably the same as the threshold for triggering of the traffic volume measurement. As it would imply a significant increase of the size of an enhanced CELL_UPDATE message with the information about the available UL traffic volume such that it would no longer fit into one RLC PDU, an alternative is to indicate with a flag if the traffic volume is, e.g., above the traffic volume threshold configured for the traffic volume measurement. This information is considered sufficient to assist the UTRAN in the decision if a UE should be moved to CELL_DCH or not and could facilitate the direct transfer to CELL_DCH from CELL/URA_PCH.

The following describes by means of non-limiting examples two conceivable embodiments to indicate said information.

In one embodiment of the present invention, the delay reducing information is indicated in an extension of the Cell Update message. The Cell Update message is extended with a flag, e.g. a single bit, indicating the relation to a threshold value, e.g. if the traffic volume in the UE is above a threshold. Potentially a second bit is used to be able to separate if the traffic volume is available on an SRB or an RB (or both). This would extend the message size with a few bits including those needed for coding of the message extension.

Another embodiment of the present invention uses currently reserved Code points. In the current cell update message there exist some spare values, i.e. the code points that are currently not used but may be transmitted with the existing message coding. Thus, it would be a possible embodiment of the present invention to use one of the reserved code points in the Cell Update message to indicate the Traffic Volume, e.g. if the Traffic Volume is above the threshold. Potentially, up to several code points are used to be able to separate if the traffic volume is available on an SRB or an RB (or both). For example, a code point I could indicate a Traffic Volume above the threshold on an RB, a code point II could indicate a Traffic Volume above the threshold on an SRB, and a code point III could indicate a Traffic Volume above the threshold on both SRB and RB. This method would not increase the message size at all.

The method according to the present invention makes it possible to move user equipments quickly to CELL_DCH in case the traffic volume is large and to move user equipments to CELL_FACH in case the traffic volume is small. The method facilitates direct transition to DCH which reduces the DCH setup time significantly. The method can thus greatly improve the performance for applications where the UE is typically in CELL_URA_PCH when data needs to be transmitted, e.g. web surfing.

UTRAN Initiated Data Transfer

Figure 5:
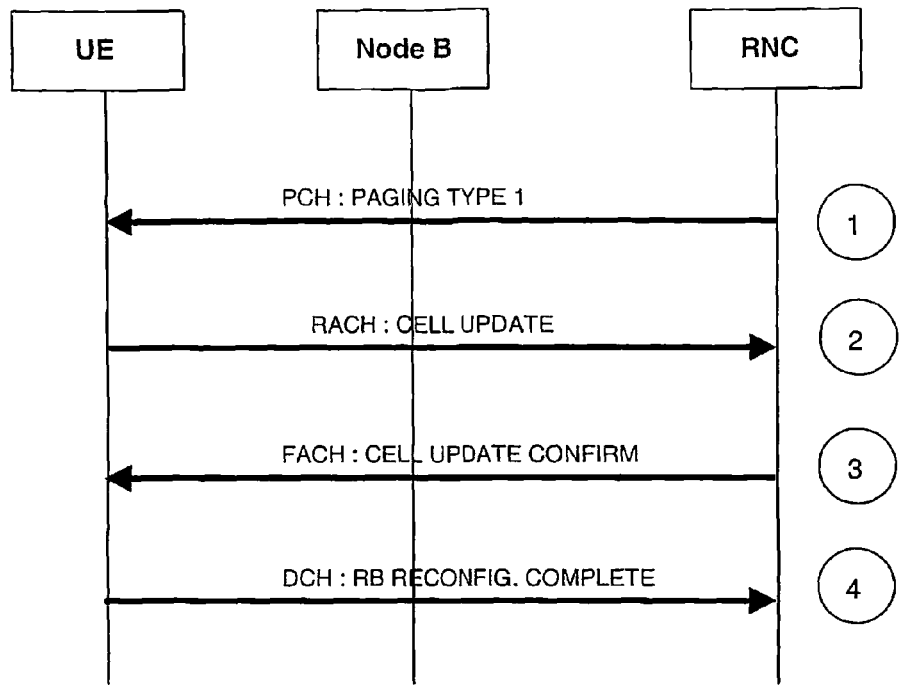
FIG. 5 shows an alternative signalling sequence for moving a UE from CELL/URA_PCH to CELL_DCH in case of a UTRAN initiated transmission.
Figure 6:
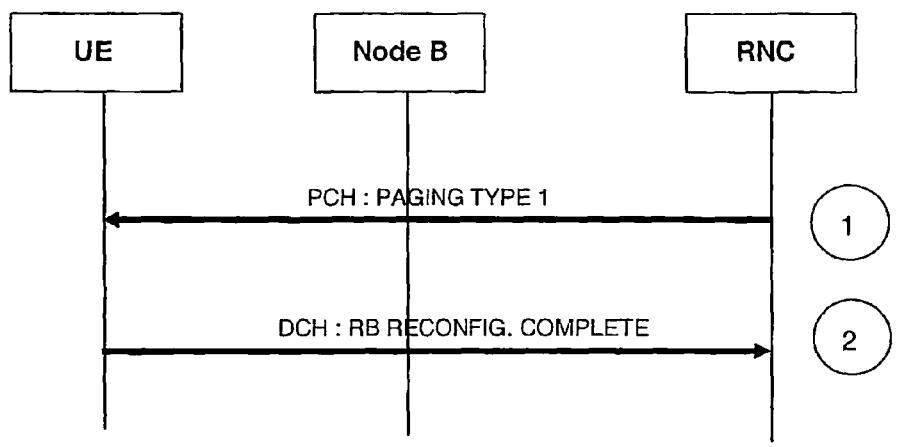
FIG. 6 shows an enhanced signalling sequence for moving a UE from CELL/URA_PCH to CELL_DCH in case of a UTRAN initiated transmission.
Figure 7:
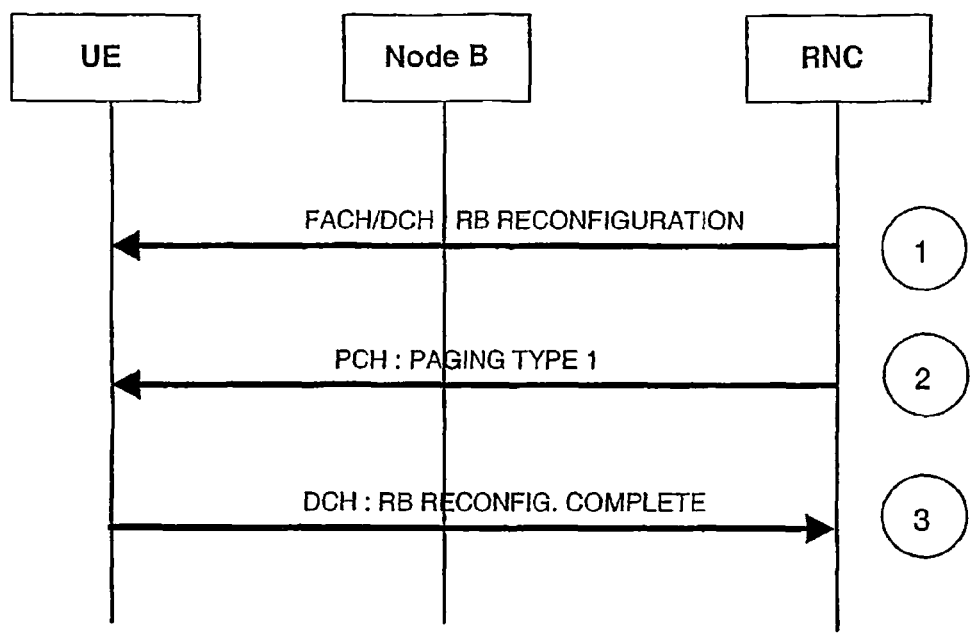
FIG. 7 shows an enhanced signalling sequence for moving a UE from CELL/URA_PCH to CELL_DCH in case of a UTRAN initiated transmission with pre-configuration of the physical channel configuration to be used on DCH.

When a UTRAN initiated transition from CELL_PCH/URA_PCH to CELL_DCH is performed the UE transits directly to CELL_DCH without exchanging messages in CELL_FACH state in between according to the present invention. Thus, the CELL_PCH/URA_PCH transition to CELL_DCH is made faster since the paging message contains the DCH configuration according to a further embodiment of the present invention. This results in a signaling sequence as shown in FIG. 6. In this embodiment, the UTRAN orders the UE to CELL_DCH already in the data transfer initiating message, Paging type 1 message in step 1. The UE responds with a Radio Bearer Reconfiguration Complete message in step 2 and can then start to receive data on DCH. In order to make this solution possible a number of information elements need to be added to the paging type 1 message. In fact, content that is present in cell update confirm in FIG. 5 may be beneficial to add to the paging message. Also compared to the content of cell update confirm the identity used in the paging type 1 message is U-RNTI and not C-RNTI.

Examples of the delay reducing information in the data transfer initiating message, the paging type 1 message, are according to this embodiment of the present invention:

Physical- and transport channel configuration parameters, code allocation and radio bearer configuration, such as Frequency, UL DPCH info (e.g. scrambling code, spreading factor, TFCI configuration), DL DPCH info (e.g. spreading factor, rate matching, power offsets) DL RL info (e.g. primary CPICH), power control configurations and potential HS-DSCH configurations.

Some other information related to RB and Transport channels may also be beneficial, but since the paging type 1 message is sent in Transparent mode and without segmentation or re-transmissions the size need to be limited, only the crucial information have been listed here.

It could be noted that normally the cell where the UE is located is not known when the UE is in URA_PCH state, so the invention is of limited use for this scenario. This is because UTRAN needy to know already when sending the paging message in which cell the UE is located in order not to establish a dedicated channel for the UE in all cells belonging to the URA. This could of course be done but would potentially mean waste of radio resources.

Therefore the invention is in particular beneficial for CELL_PCH UEs. For URA_PCH Ues there is a benefit in case the UE has made its presence in a cell known to UTRAN rather recently.

The following describes by means of non-limiting examples two conceivable embodiments to indicate the delay reducing information in an extension of the paging type 1 message:

Explicit indication: The Paging type 1 message is extended with the explicit information needed to perform the direct transition to CELL_DCH.

Implicit indication: In order to save space in the paging type 1 message a previously transmitted downlink message (e.g. a RB reconfiguration message) moving the UE to CELL_PCH/URA_PCH comprises the delay reducing information, i.e. all or a part of the configurations needed to perform the direct transition to CELL_DCH at a later stage. The paging type 1 message itself that may be sent a long time later, and then only comprises the actual code that the UE should use and/or a pointer to the already sent physical channel configuration.

As an alternative to extending the paging message with DCH information, the Cell Update Confirm message is modified to be transmitted on the paging channel (step 1 in FIG. 5) instead of the FACH. The method makes it possible to move UEs quickly to CELL_DCH in case the traffic volume is large. The method facilitates direct transition to DCH which reduces the DCH setup time significantly. The method can greatly improve the performance for applications where the UE is typically in CELL_PCH/URA_PCH when data needs to be transmitted to the UE (e.g. Push-to-Talk services).

Thus the RNC in accordance with present invention comprises means for transmitting a paging message on a paging channel, PCH, to the UE and means for receiving a cell update message from the UE The RNC comprises further means for transmitting a cell update confirm message on a Forward Access Channel, FACH, and means for transferring the UE from the URA PCH or the CELL PCH state directly to the CELL DCH state.

Accordingly, the UE comprises means for receiving a paging message on a paging channel, PCH, from the RNC and means for transmitting a cell update message to the RNC. The UE further comprises means for receiving a cell update confirm message on a Forward Access Channel, FACH, and means for transferring the UE from the URA PCH or the CELL PCH state directly to the CELL DCH state.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method for initiating a data transfer from a Radio Network Controller (RNC), wherein the method comprises:
   transmitting, by the RNC in a Universal Mobile Telecommunications Systems (UMTS) terrestrial radio access network (UTRAN), a downlink paging message to a User Equipment (UE), wherein the downlink paging message comprises information for transferring the UE from a URA PCH or a CELL PCH state directly to a CELL DCH state by means of delay reducing information indicated in the downlink paging message, wherein the UTRAN comprises at least the RNC connectable to the UE, wherein the UE is capable of being in the states URA PCH, CELL PCH, or CELL DCH, and wherein the delay reducing information comprises two or more information parameters selected from the group consisting of: physical and transport channel configuration parameters, code allocation and radio bearer configuration, and the identity parameter U-RNTI.

2. The method according to claim 1, wherein the delay reducing information further comprises at least one of:
   uplink Dedicated Physical Channel, (DPCH) related information;
   downlink DPCH related information;
   downlink radio link related information;
   power control configurations; and,
   potential high speed downlink shared channel (HS-DSCH) configurations.

3. The method according to claim 1, wherein the delay reducing information is indicated in an extension of the paging message.

4. The method according to claim 3, wherein the delay reducing information is indicated in the extension explicitly.

5. The method according to claim 4, wherein the delay reducing information in said extension is indicated by a pointer to a previously transmitted downlink message, wherein the previously transmitted downlink message comprises the delay reducing information.

6. The method according to claim 5, wherein the previously transmitted downlink message is a Radio Bearer reconfiguration message.

7. A Radio Network Controller (RNC) comprising:
   means for indicating delay reducing information in a downlink paging message, wherein the delay reducing information comprises two or more information parameters selected from the group consisting of: physical and transport channel configuration parameters, code allocation and radio bearer configuration, and the identity parameter U-RNTI; and, means for transmitting the downlink paging message to a User Equipment (UE), wherein the downlink paging message comprises information for transferring the UE from a URA PCH or a CELL PCH state directly to a CELL DCH state by means of the delay reducing information, wherein the RNC is connectable to a Universal Mobile Telecommunications Systems (UMTS) terrestrial radio access network (UTRAN) and to the UE, wherein the UE is capable of being in the states URA PCH, CELL PCH, CELL FACH or CELL DCH.

8. A method comprising:

receiving, by a User Equipment (UE) for use in a Universal Mobile Telecommunications Systems (UMTS) terrestrial radio access network (UTRAN), a downlink paging message from a Radio Network Controller (RNC), the downlink paging message indicating delay reducing information, wherein the delay reducing information comprises two or more information parameters selected from the group consisting of: physical and transport channel configuration parameters, code allocation and radio bearer configuration, and the identity parameter U-RNTI, wherein the UE is capable of being in the states URA PCH, CELL PCH, CELL FACH or CELL DCH; and, transferring the UE from the URA PCH or the CELL PCH state directly to the CELL DCH state as a function of the delay reducing information indicated in the downlink paging message.

9. The method of claim 8, wherein the delay reducing information further comprises at least one of:

uplink Dedicated Physical Channel, (DPCH) related information;

downlink DPCH related information;

downlink radio link related information;

power control configurations; and, potential high speed downlink shared channel (HS-DSCH) configurations.

10. The method of claim 8, wherein the delay reducing information is indicated in an extension of the paging message.

11. The method of claim 10, wherein the delay reducing information is indicated in the extension explicitly.

12. The method of claim 11, wherein the delay reducing information in said extension is indicated by a pointer to a previously transmitted downlink message, wherein the previously transmitted downlink message comprises the delay reducing information.

13. The method according to claim 12, wherein the previously transmitted downlink message is a Radio Bearer reconfiguration message.

14. A User Equipment (UE) comprising:

a receiver for receiving a downlink paging message from a Radio Network Controller (RNC), the downlink paging message indicating delay reducing information, wherein the delay reducing information comprises two or more information parameters selected from the group consisting of: physical and transport channel configuration parameters, code allocation and radio bearer configuration, and the identity parameter U-RNTI; and, a transfer for transferring the UE from a URA PCH or a CELL PCH state directly to a CELL DCH state as a function of the delay reducing information indicated in the downlink paging message, wherein the UE is for use in a Universal Mobile Telecommunications Systems (UMTS) terrestrial radio access network (UTRAN), wherein the UE is capable of being in the states URA PCH, CELL PCH, CELL FACH or CELL DCH.

15. A method for initiating a data transfer from a Radio Network Controller (RNC) comprising:

transmitting, by the RNC in a Universal Mobile Telecommunications Systems (UMTS) terrestrial radio access network (UTRAN), a paging message on a paging channel (PCH) to a User Equipment (UE), wherein the UTRAN comprises at least the RNC connectable to the UE, wherein the UE is capable of being in the states URA PCH, CELL PCH, or CELL DCH, wherein delay reducing information is indicated in the paging message, wherein the delay reducing information comprises two or more information parameters selected from the group consisting of: physical and transport channel configuration parameters, code allocation and radio bearer configuration, and the identity parameter U-RNTI;

receiving a cell update message from the UE; and, transmitting a cell update confirm message on the PCH to the UE, said cell update confirm message causing said UE to transfer from the URA PCH or the CELL PCH state directly to the CELL DCH state.

16. A Radio Network Controller (RNC) comprising:

means for transmitting a paging message on a paging channel (PCH) to a User Equipment (UE), wherein the RNC is for use in a Universal Mobile Telecommunications Systems (UMTS) terrestrial radio access network (UTRAN), wherein the UE is capable of being in the states URA PCH, CELL PCH, or CELL DCH, wherein delay reducing information is indicated in the paging message, wherein the delay reducing information comprises two or more information parameters selected from the group consisting of: physical and transport channel configuration parameters, code allocation and radio bearer configuration, and the identity parameter U-RNTI;

means for receiving a cell update message from the UE; and, means for transmitting a cell update confirm message on the PCH, said cell update confirm message causing said UE to transfer from the URA PCH or the CELL PCH state directly to the CELL DCH state.

17. A method comprising:

receiving, by a User Equipment (UE) in a Universal Mobile Telecommunications Systems (UMTS) terrestrial radio access network (UTRAN), a paging message on a paging channel (PCH) from a Radio Network Controller (RNC), wherein the UE is capable of being in the states URA PCH, CELL PCH, or CELL DCH, wherein delay reducing information is indicated in the paging message, wherein the delay reducing information comprises two or more information parameters selected from the group consisting of: physical and transport channel configuration parameters, code allocation and radio bearer configuration, and the identity parameter U-RNTI;

transmitting a cell update message to the RNC;

receiving a cell update confirm message on the PCH; and, transferring the UE from the URA PCH or the CELL PCH state directly to the CELL DCH state in response to receiving the cell update confirm message.

18. A User Equipment (UE) comprising:

means for receiving a paging message on a paging channel (PCH) from a Radio Network Controller (RNC), wherein the UE is for use in a Universal Mobile Telecommunications Systems (UMTS) terrestrial radio access network (UTRAN), wherein the UE is capable of being in the states URA PCH, CELL PCH, or CELL DCH, wherein delay reducing information is indicated in the paging message, wherein the delay reducing information comprises two or more information parameters selected from the group consisting of: physical and transport channel configuration parameters, code allocation and radio bearer configuration, and the identity parameter U-RNTI;

means for transmitting a cell update message to the RNC; and, means for receiving a cell update confirm message on the PCH; and, means for transferring the UE from the URA PCH or the CELL PCH state directly to the CELL DCH state in response to receiving said cell update confirm message.

\* \* \* \* \*